US008967845B2

(12) United States Patent
Bennett et al.

(10) Patent No.: US 8,967,845 B2
(45) Date of Patent: Mar. 3, 2015

(54) LIGHT DIFFUSING OPTICAL FIBER BUNDLES, ILLUMINATION SYSTEMS INCLUDING LIGHT DIFFUSING OPTICAL FIBER BUNDLES, AND METHODS OF AFFIXING LIGHT DIFFUSING OPTICAL FIBER BUNDLES TO POLYMER OPTICAL FIBERS

(71) Applicant: Corning Incorporated, Corning, NY (US)

(72) Inventors: Kevin Wallace Bennett, Hammdondsport, NY (US); Edward John Fewkes, Corning, NY (US); Stephan Lvovich Logunov, Corning, NY (US); Vineet Tyagi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 177 days.

(21) Appl. No.: 13/826,980

(22) Filed: Mar. 14, 2013

(65) Prior Publication Data

US 2014/0198520 A1    Jul. 17, 2014

Related U.S. Application Data

(60) Provisional application No. 61/759,637, filed on Feb. 1, 2013, provisional application No. 61/751,437, filed on Jan. 11, 2013.

(51) Int. Cl.
*G02B 6/44* (2006.01)
*F21V 8/00* (2006.01)
*G02B 6/04* (2006.01)
*G02B 6/02* (2006.01)

(52) U.S. Cl.
CPC ............ *G02B 6/0006* (2013.01); *G02B 6/0001* (2013.01); *G02B 6/001* (2013.01); *G02B 6/04* (2013.01); *G02B 6/02338* (2013.01); *G02B 6/02366* (2013.01)
USPC ............................ 362/556; 362/554; 362/558

(58) Field of Classification Search
CPC ............................ G02B 6/001; G01J 3/02118
USPC ............................. 362/556, 554, 558
See application file for complete search history.

(56) References Cited

U.S. PATENT DOCUMENTS

| | | |
|---|---|---|
| 5,345,531 A | 9/1994 | Keplinger et al. |
| 7,260,298 B2 | 8/2007 | Furman et al. |
| 8,492,448 B2 | 7/2013 | Dewa et al. |

(Continued)

FOREIGN PATENT DOCUMENTS

| | | |
|---|---|---|
| JP | H1152171 | 2/1999 |
| WO | WO2010/011299 | 1/2010 |

*Primary Examiner* — Vip Patel
(74) *Attorney, Agent, or Firm* — Svetlana Short

(57) ABSTRACT

Light diffusing optical fiber bundles, illumination systems including light diffusing optical fiber bundles, and methods of affixing light diffusing optical fiber bundles to polymer optical fibers are disclosed. A light diffusing optical fiber bundle includes an optically transmissive jacket and a plurality of light diffusing optical fibers disposed within the optically transmissive jacket. Each of the plurality of light diffusing optical fibers includes a glass core including a plurality of nano-sized voids. The plurality of light diffusing optical fibers extend along a length of the optically transmissive jacket such that the plurality of diffusing optical fibers are not interwoven.

24 Claims, 7 Drawing Sheets

(56) References Cited

U.S. PATENT DOCUMENTS

| | | |
|---|---|---|
| 8,724,942 B2 * | 5/2014 | Logunov et al. ................. 385/31 |
| 2009/0110008 A1 | 4/2009 | Dong et al. |
| 2011/0103757 A1 | 5/2011 | Alkemper et al. |
| 2011/0122646 A1 * | 5/2011 | Bickham et al. ............... 362/554 |
| 2011/0305035 A1 | 12/2011 | Bickham et al. |
| 2012/0275178 A1 | 11/2012 | Logunov |
| 2012/0275180 A1 * | 11/2012 | Button et al. ................. 362/558 |
| 2012/0275745 A1 | 11/2012 | Logunov |
| 2013/0088888 A1 | 4/2013 | Fewkes et al. |
| 2013/0107565 A1 | 5/2013 | Genier |
| 2013/0156391 A1 | 6/2013 | Logunov et al. |
| 2013/0156392 A1 | 6/2013 | Logunov et al. |

* cited by examiner

LIGHT DIFFUSING OPTICAL FIBER BUNDLES, ILLUMINATION SYSTEMS INCLUDING LIGHT DIFFUSING OPTICAL FIBER BUNDLES, AND METHODS OF AFFIXING LIGHT DIFFUSING OPTICAL FIBER BUNDLES TO POLYMER OPTICAL FIBERS

CROSS-REFERENCE TO RELATED APPLICATIONS

This application claims the benefit of priority under 35 U.S.C. §119 of U.S. Provisional Application Ser. No. 61/751,437 filed on Jan. 11, 2013 and U.S. Provisional Application Ser. No. 61/759,637 filed on Feb. 1, 2013 the contents of which are relied upon and incorporated herein by reference in their entirety.

BACKGROUND

1. Field

The present specification generally relates to optical fiber bundles, and, more particularly, to light diffusing optical fiber bundles, illumination systems including light diffusing optical fiber bundles, and methods of affixing light diffusing optical fiber bundles to polymer optical fibers.

2. Technical Background

Optical fibers are used in a wide variety of applications in which light is delivered from a light source to a target region. For example, in some applications, such as lighting, signage, biological applications, etc., light diffusing optical fibers may be utilized such that light propagating through the light diffusing optical fiber is scattered radially outward along a length of the fiber, thereby illuminating the target region along the length of the fiber.

Light diffusing optical fibers may be coupled to light sources that emit light in a Lambertian radiation pattern (e.g., a light sources that emits light with a radiation pattern that follows Lambert's cosine law), such as light emitting diode ("LED") light sources. When light diffusing optical fibers are coupled to light sources that emit light in a Lambertian radiation pattern, it may be desirable for the light diffusing optical fibers to efficiently harvest the emitted light.

Accordingly, a need exists for alternative light diffusing optical fiber bundles that efficiently harvest emitted light, illuminations systems including light diffusing optical fiber bundles, and methods of affixing light diffusing optical fiber bundles to polymer optical fibers.

SUMMARY

According to one embodiment, a light diffusing optical fiber bundle includes an optically transmissive jacket and a plurality of light diffusing optical fibers disposed within the optically transmissive jacket. Each of the plurality of light diffusing optical fibers includes a glass core including a plurality of nano-sized voids. The plurality of light diffusing optical fibers extend along a length of the optically transmissive jacket such that the plurality of diffusing optical fibers are not interwoven.

In another embodiment, an illumination system includes a light source for emitting light and a light diffusing optical fiber bundle optically coupled to the light source. At least a portion of the emitted light enters the light diffusing optical fiber bundle. The light diffusing optical fiber bundle includes an optically transmissive jacket and a plurality of light diffusing optical fibers disposed within the optically transmissive jacket. Each of the plurality of light diffusing optical fibers includes a glass core including a plurality of nano-sized voids. The plurality of light diffusing optical fibers extend along a length of the optically transmissive jacket such that the plurality of diffusing optical fibers are not interwoven.

In yet another embodiment, a method of affixing a light diffusing optical fiber bundle to a polymer optical fiber includes providing the light diffusing optical fiber bundle. The light diffusing optical fiber bundle includes an optically transmissive jacket and a plurality of light diffusing optical fibers disposed within the optically transmissive jacket. Each of the plurality of light diffusing optical fibers includes a glass core including a plurality of nano-sized voids. The plurality of light diffusing optical fibers extend along a length of the optically transmissive jacket such that the plurality of diffusing optical fibers are not interwoven. The method further includes providing the polymer optical fiber, softening an insertion end of the polymer optical fiber, and inserting an end of the light diffusing optical fiber bundle into the softened insertion end of the polymer optical fiber, thereby affixing the light diffusing optical fiber bundle to the polymer optical fiber.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 5:
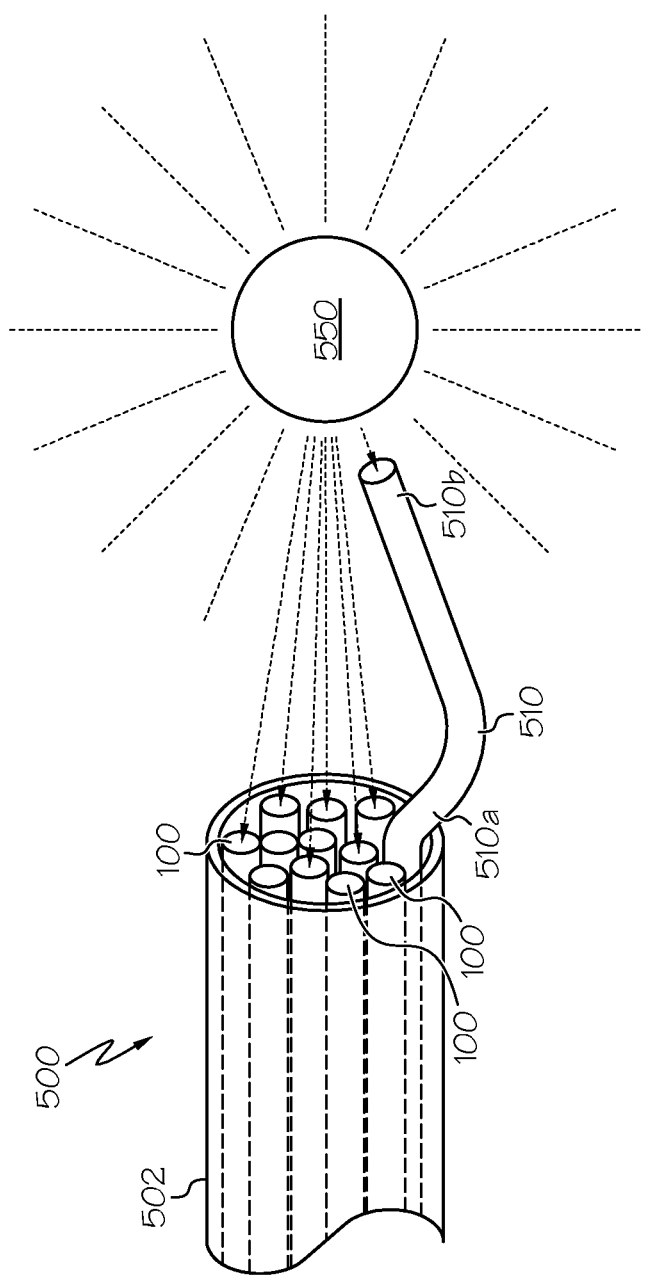
FIG. 5 schematically depicts an illumination system including a light diffusing optical fiber bundle, according to one or more embodiments shown and described herein.

Reference will now be made in detail to various embodiments of light diffusing optical fiber bundles, illuminations systems including light diffusing optical fiber bundles, and methods of affixing light diffusing optical fiber bundles to polymer optical fibers, examples of which are illustrated in the accompanying drawings. Whenever possible, the same reference numerals will be used throughout the drawings to refer to the same or like parts. FIG. 5 schematically depicts an illumination system in which a light source is optically coupled to a light diffusing optical fiber bundle that includes a plurality of light diffusing optical fibers disposed within an optically transmissive jacket. Each of the plurality of light diffusing optical fibers disposed within the optically transmissive jacket includes a glass core having a plurality of nano-sized voids. The plurality of light diffusing optical fibers extend along a length of the optically transmissive jacket such that the plurality of light diffusing optical fibers are not interwoven. The non-interwoven arrangement of the plurality of light diffusing optical fibers within the optically transmissive jacket may enhance the ability to bend the light diffusing optical fiber bundles because non-interwoven fibers may move freely during bending. The non-interwoven arrangement of the plurality of light diffusing optical fibers within the optically transmissive jacket may also enhance the flexibility of the light diffusing optical fiber bundles. Light diffusing optical fiber bundles, illuminations systems including light diffusing optical fiber bundles, and methods of affixing light diffusing optical fiber bundles to polymer optical fibers are described in more detail herein with specific reference to the appended figures.

The following terminology will be used herein to describe the light diffusing optical fibers of the present specification:

The term "refractive index profile," as used herein, is the relationship between the refractive index or the relative refractive index and the radius of the fiber.

The term "relative refractive index percent," as used herein, is defined as:

$$\Delta(r)\% = 100 \times [n(r)^2 - n_{REF}^2)]/2n(r)^2,$$

where n(r) is the refractive index at radius r, unless otherwise specified. The relative refractive index percent is defined at 850 nm unless otherwise specified. In one aspect, the reference index $n_{REF}$ is silica glass with the refractive index of 1.452498 at 850 nm. In another aspect, $n_{REF}$ is the maximum refractive index of the cladding at 850 nm. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant," as used herein, refers to a dopant which raises the refractive index of glass relative to pure undoped $SiO_2$. The term "downdopant," as used herein, is a dopant which has a propensity to lower the refractive index of glass relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

The term "α-profile" or "alpha profile," as used herein, refers to a relative refractive index profile, expressed in terms of $\Delta(r)$ which is in units of "%", where r is the radius and which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the α-profile, $r_f$ is the final point of the α-profile, and α is an exponent which is a real number.

The term "parabolic," as used herein, includes substantially parabolically shaped refractive index profiles which may vary slightly from an α value of 2.0 at one or more points in the core, as well as profiles with minor variations and/or a centerline dip. In some exemplary embodiments, α is greater than 1.5 and less than 2.5, more preferably greater than 1.7 and 2.3 and even more preferably between 1.8 and 2.3, as measured at 850 nm. In other embodiments, one or more segments of the refractive index profile have a substantially step index shape with an α value greater than 8, more preferably greater than 10 even more preferably greater than 20, as measured at 850 nm.

The term "nano-sized void," as used herein, describes a void with a cross-sectional diameter of 50 nm to 2 μm.

The term "nano-structured region," as used herein, describes a region or area of the fiber with a large number (e.g., greater than 50) of nano-sized voids in the cross-section of the fiber.

The term "optically transmissive jacket," as used herein, describes a transparent or translucent jacket capable of transmitting light through a thickness of at least a portion of the jacket.

Figure 1A:
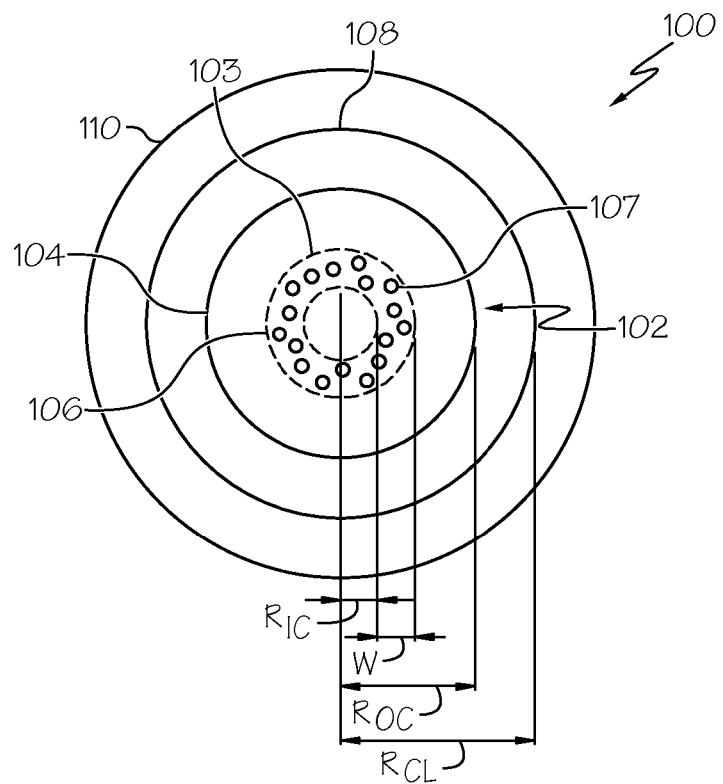
FIGS. 1A-1C schematically depict cross sections of light diffusing optical fibers having a plurality of nano-sized voids in a core portion of the fibers, according to one or more embodiments shown and described herein.

Referring now to FIG. 1A, one embodiment of a light diffusing optical fiber 100 is schematically depicted. The light diffusing optical fiber 100 generally includes a core portion 102, with a nano-structured ring 106, and a cladding 108. In the embodiment shown in FIG. 1A, the core portion 102 is formed from silica-based glass and has an index or refraction n. The core portion 102 extends from the center line of the light diffusing optical fiber 100 to a radius $R_{OC}$. In some embodiments, the radius $R_{OC}$ of the core portion 102 may be such that 10 μm ≤ $R_{OC}$ ≤ 600 μm. In some embodiments, the radius $R_{OC}$ of the core portion 102 may be such that 30 μm ≤ $R_{OC}$ ≤ 400 μm. In some embodiments, the radius $R_{OC}$ of the core portion 102 may be such that 125 μm ≤ $R_{OC}$ ≤ 300 μm. In some embodiments, the radius $R_{OC}$ of the core portion 102 may be such that 50 μm ≤ $R_{OC}$ ≤ 200 μm. In some embodiments, the radius $R_{OC}$ of the core portion 102 may be about 90 μm.

In some embodiments, the core portion 102 of the light diffusing optical fiber 100 is a graded-index core such that the refractive index profile of the core has a parabolic (or substantially parabolic) shape. For example, in some embodiments, the refractive index profile of the core portion 102 has an α-shape with an α value of about 2, preferably between 1.8 and 2.3, as measured at 850 nm. In other embodiments, one or more segments of the refractive index profile of the core portion 102 have a step index shape with an α value greater than 8, more preferably greater than 10, and, even more preferably, greater than 20 as measured at 850 nm. In some embodiments, the refractive index of the core portion may have a centerline dip, wherein the maximum refractive index of the core, and the maximum refractive index of the entire optical fiber, is located a small distance away from long axis 105 of the light diffusing optical fiber 100. However, in other embodiments the refractive index of the core portion 102 has no centerline dip, and the maximum refractive index of the core portion 102, and the maximum refractive index of the entire light diffusing optical fiber is located at the centerline.

The nano-structured ring 106 of the core portion is formed from silica-based glass and generally includes a plurality of nano-sized voids. In some embodiments, the width W of the nano-structured ring 106 is preferably 0.1 Roc≤W≤Roc. In some embodiments, the width W of the nano-structured ring 106 is between about 5 μm to about 240 μm.

The nano-sized voids 107 are utilized to scatter light propagating in the core portion 102 of the light diffusing optical fiber 100 such that the light is directed radially outward from the core portion 102, thereby illuminating the light diffusing optical fiber and the space surrounding the light diffusing optical fiber.

The nano-sized voids 107 contained in the nano-structured ring 106 generally have a diameter of about 50 nm to about 2 μm. In some embodiments described herein, the nano-sized voids 107 have a length of about 0.5 mm to about 1 m.

The nano-sized voids 107 are voids in the sense that they do not contain glass. However, in embodiments described herein, the voids may be filled with a gas which is introduced into the voids during formation of the optical fiber preform from which the fiber is drawn. For example, the nano-sized voids 107 may be filled with $SO_2$, Kr, Ar, $CO_2$, $N_2$, $O_2$, or mixtures thereof. Alternatively, the nano-sized voids 107 may be substantially devoid of any gas. However, regardless of the presence or absence of any gas, the average refractive index $n_2$ of the nano-structured ring 106 is lowered relative to silica glass due to the presence of the nano-sized voids 107.

In the embodiments described herein, the nano-structured ring 106 may be located at different positions in the core portion 102 in order to achieve the desired increase in scattering-induced attenuation losses. Referring to the embodiment of the light diffusing optical fiber 100 depicted in FIG. 1A, the nano-structured ring 106 is positioned within the core portion 102. Specifically, in this embodiment, the core portion 102 includes an inner core portion 103 and an outer core portion 104 which are separated by the nano-structured ring 106 which includes a plurality of nano-sized voids 107. The nano-structured ring 106 surrounds the inner core portion 103 and is in direct contact with both the inner core portion 103 and the outer core portion 104. The inner core portion 103 may be formed from silica-based glass and have an index of refraction $n_1$. The outer core portion 104 may also be formed from silica-based glass and have an index of refraction $n_3$. In general, the index of refraction $n_1$ of the inner core portion 103 and the index of refraction $n_3$ of the outer core portion 104 are greater than the index of refraction $n_2$ of the nano-structured ring 106.

In some embodiments, the inner core portion 103 has a radius $R_{IC}$ in the range of 0.1 $R_{OC} \leq R_{IC} \leq 0.9$ $R_{OC}$. In some embodiments, the inner core portion 103 has a radius $R_{IC}$ in the range of 0.1 $R_{OC} \leq R_{IC} \leq 0.6$ $R_{OC}$.

Still referring to FIG. 1A, the light diffusing optical fiber 100 may further comprise a cladding 108 which surrounds and is in direct contact with the core portion 102. The cladding 108 may be formed from a material which has a low refractive index in order to increase the numerical aperture (NA) of the light diffusing optical fiber 100. For example, the numerical aperture of the fiber may be greater than about 0.3, more preferably greater than about 0.4. In one embodiment, the cladding 108 may be formed from a low index polymeric material such as UV or thermally curable fluoroacrylate or silicone. In other embodiments the cladding 108 may be formed from silica glass which is down-doped with a down-dopant, such as, for example, fluorine. The cladding 108 generally has an index of refraction $n_4$ which is less than the index of refraction of the core portion 102, and, more specifically, less than the index of refraction $n_1$ of the inner core portion 103 and the index of refraction $n_3$ of the outer core portion 104. In some embodiments, the index of refraction $n_4$ of the cladding 108 may be less than the index of refraction $n_2$ of the nano-structured ring 106. In one particular embodiment, the cladding 108 is a low index polymer cladding with a relative refractive index that is negative relative to silica glass. For example, the relative refractive index of the cladding may be less than about −0.5% and even more preferably less than −1%.

The cladding 108 generally extends from the outer radius $R_{OC}$ of the core portion 102 to a radius $R_{CL}$. In some embodiments, the radial width of the cladding 108 (i.e., $R_{CL}-R_{OC}$) is greater than about 10 μm. In some embodiments, the radial width of the cladding 108 (i.e., $R_{CL}-R_{OC}$) is greater than about 15 μm.

Figure 2:
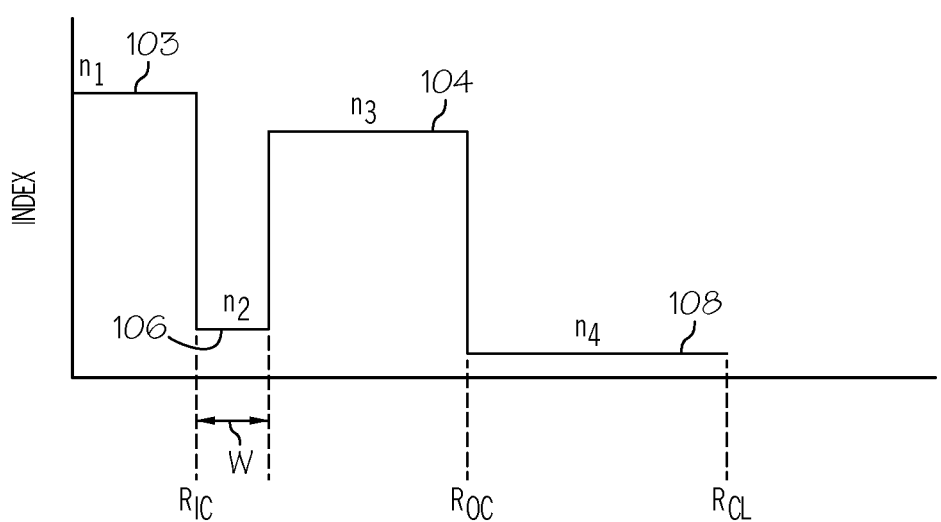
FIG. 2 schematically depicts a refractive index profile of the light diffusing optical fiber of FIG. 1A, according to one or more embodiments shown and described herein.

Referring to FIGS. 1A and 2, FIG. 2 graphically depicts a refractive index profile of the light diffusing optical fiber 100 of FIG. 1A. As shown in FIG. 2, the index of refraction $n_1$ of the inner core portion 103 and the index of refraction $n_3$ of the outer core portion 104 are greater than the index of refraction $n_2$ of the nano-structured ring 106. For example, in the embodiment shown in FIG. 1A, the inner core portion 103 and the outer core portion 104 may be formed from silica-based glass which includes dopants, such as Ge, Al, P or similar updopants, such that the index of refraction $n_1$ of the inner core portion 103 and the index of refraction $n_3$ of the outer core portion 104 are greater than the index of refraction of un-doped silica glass of the nano-structured ring 106. Moreover, in this example, the relative amounts and/or types of dopants used in the inner core portion 103 and the outer core portion 104 may be different such that $n_1 > n_3$, as depicted in the refractive index profile shown in FIG. 2. Further, the nano-structured ring 106 may be formed with down-doped silica glass such that the index of refraction $n_2$ of the nano-structured ring is significantly less than the indices of refraction of either the inner core portion 103 or the outer core portion 104. In this exemplary refractive index profile $n_1 > n_3 > n_2 > n_4$. However, it should be understood that other profiles may be possible, so long as the inner core portion and the outer core portion have indices of refraction greater than the nano-structured ring and the index of refraction of the cladding is less than the index of refraction of the core portion so as to facilitate a light diffusing optical fiber with a high numerical aperture.

For example, while inner core portion 103, the outer core portion 104 and the nano-structured ring 106 have been described herein as comprising dopants, it should be understood that one or more of these portions may be formed without dopants so long as $n_1$ and $n_3$ are greater than $n_2$. For example, in one embodiment, the inner core portion 103 and the outer core portion 104 may be formed without dopants while the nano-structured ring 106 is down-doped. Alternatively, the inner core portion 103 and the outer core portion 104 may be up-doped while the nano-structured ring 106 is formed without dopants.

Figure 4:
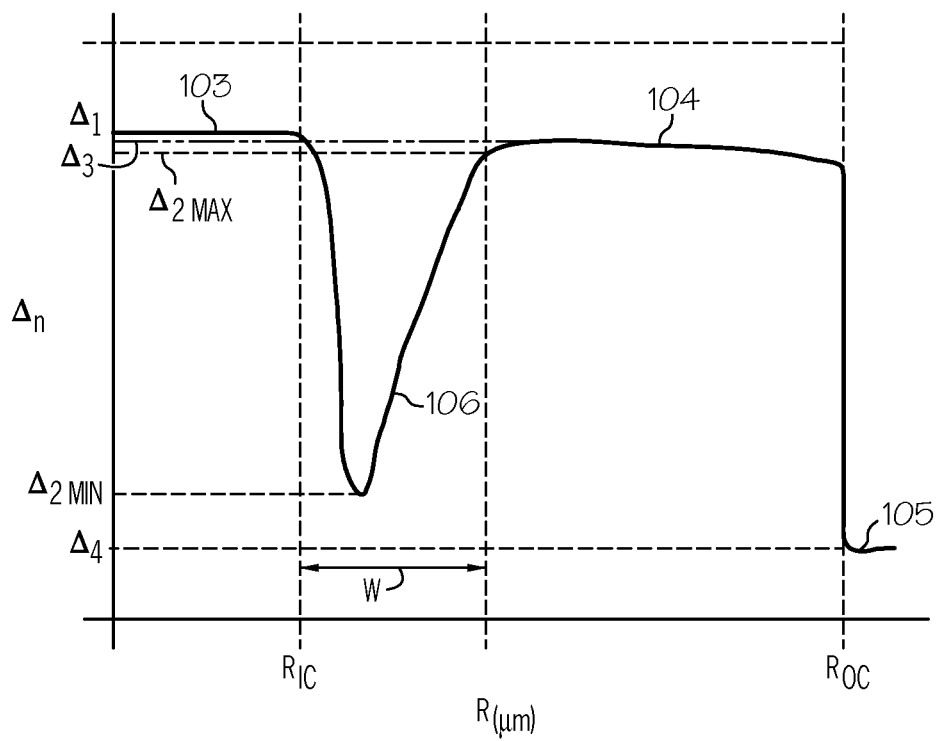
FIG. 4 schematically depicts a relative refractive index profile of the light diffusing optical fiber of FIG. 1A, according to one or more embodiments shown and described herein.

Referring now to FIGS. 1A, 2 and 4, an exemplary relative refractive index profile for the core portion and cladding portion of the light diffusing optical fiber 100 shown in FIG. 1A is graphically depicted. The reference index $n_{REF}$ is the refractive index of the cladding 108. In this embodiment, the inner core portion 103 has a relative refractive index profile $\Delta 1$ corresponding to a maximum refractive index $n_1$ which, in this embodiment, is constant. The nano-structured ring 106 has minimum refractive index $n_2$, a relative refractive index profile $\Delta 2(r)$, a maximum relative refractive index $\Delta 2_{MAX}$, and a minimum relative refractive index $\Delta 2_{MIN}$. The outer core portion 104 has a relative refractive index profile $\Delta 3(r)$ with a maximum relative refractive index $\Delta 3_{MAX}$ corresponding to a maximum refractive index $n_3$ which, in this embodiment, is constant. In this embodiment the cladding 108 has a relative refractive index profile $\Delta 4(r)$ corresponding to a refractive index $n_4$ which, in this embodiment, is constant. In this embodiment the refractive indices of the regions have the following relationship $n_1 > n_3 > n_2 > n_4$.

Referring again to FIG. 1A, the light diffusing optical fiber 100 may optionally include a coating layer 110 which surrounds and is in direct contact with the cladding 108. For example, in one embodiment, the coating layer 110 comprises a low modulus primary coating layer and a high modulus secondary coating layer which surrounds the low modulus primary coating layer. In some embodiments, the coating layer 110 comprises a polymer coating such as an acrylate-based or silicone based polymer. In at least some embodiments, the coating layer 110 has a constant diameter along the length of the light diffusing optical fiber.

In some embodiments, the coating layer 110 may be utilized to enhance the distribution and/or the nature of the light emitted radially from the core portion 102 and passed through the cladding 108. For example, in some embodiments, the coating layer 110 may include a scattering material on the outer-most surface of the coating layer 110. The scattering material may contain $TiO_2$-based white ink which provides for an angular distribution of light scattered from the core portion 102 of the light diffusing optical fiber 100. For example, in some embodiments, the ink layer may have a thickness of about 1 μm to about 5 μm. In other embodiments, the thickness of the ink layer and/or the concentration of the pigment in the ink layer may be varied along the axial length of the fiber so as to provide more uniform variation in the intensity of light scattered from the light diffusing optical fiber 100 at large angles (i.e., angles greater than about 15 degrees).

Alternatively or additionally, the coating layer 110 may contain a fluorescent material that converts light scattered from the core portion 102 to a longer wavelength of light. In some embodiments, white light can be emitted from the light diffusing optical fiber by coupling the light diffusing optical fiber 100 with such a fluorescent material in the coating layer 110 to a UV light source such as, for example, a 405 nm or 445 nm UV LED. The UV light from the light source that is scattered from the core portion 102 fluoresces the material in the coating layer such that white light is emitted from the light diffusing optical fiber 100.

Figure 1B:
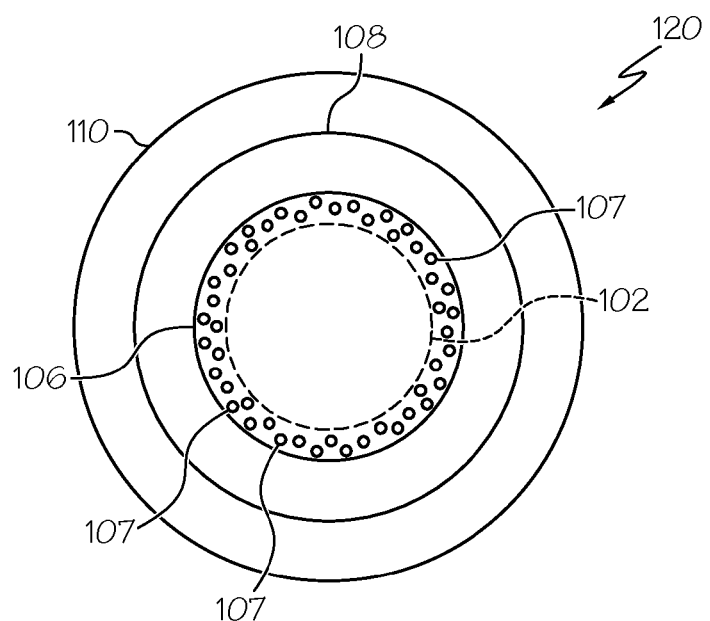
Figure 3:
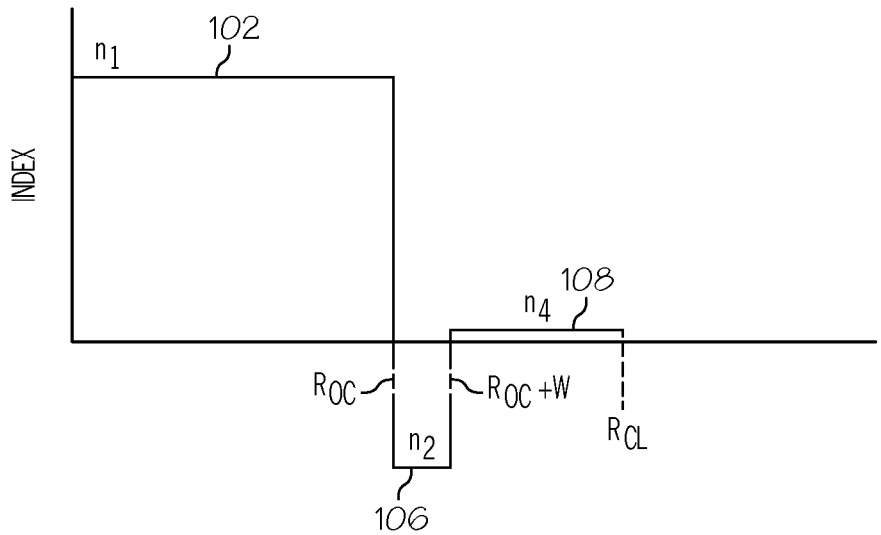
FIG. 3 schematically depicts a refractive index profile of the light diffusing optical fiber of FIG. 1B, according to one or more embodiments shown and described herein.

Referring now to FIGS. 1B and 3, in another embodiment, the light diffusing optical fiber 120 includes a core portion 102 with a nano-structured ring 106, a cladding 108, and a coating layer 110, as described above. However, in this embodiment, the nano-structured ring 106 is the outermost region of the core portion 102 such that the cladding 108 surrounds and is in direct contact with the nano-structured ring 106. The nano-structured ring 106 includes a plurality of nano-sized voids. Moreover, in this embodiment, the core portion 102 may have a step refractive index profile, as described hereinabove, or, alternatively, a graded refractive index profile, with an α-value of, for example, greater than or equal to about 1.8 and less than or equal to about 2.3. In this embodiment, the refractive index $n_1$ of the core portion 102 is generally greater than the refractive index $n_4$ of the cladding 108 which, in turn, has a refractive index greater than the nano-structured ring 106 such that $n_1 > n_4 > n_2$, as depicted in FIG. 3.

Figure 1C:
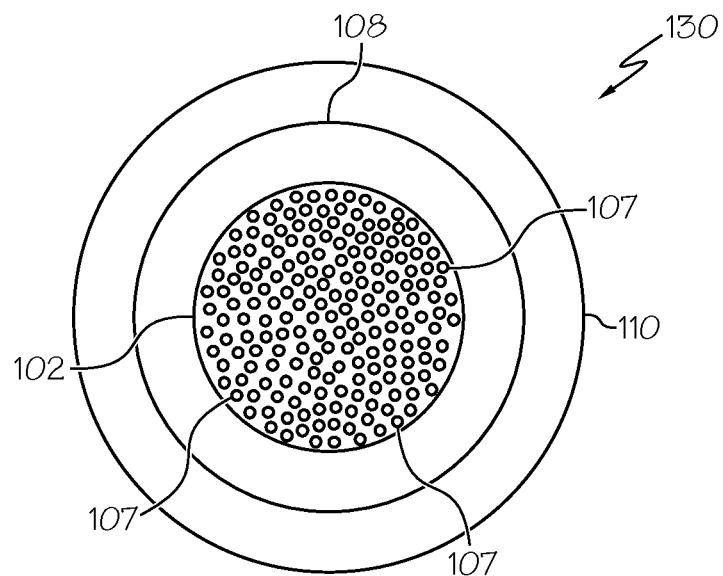

Referring now to FIG. 1C, in another embodiment, the light diffusing optical fiber 130, includes a core portion 102, a cladding 108 and a coating layer 110, as described hereinabove with respect to FIGS. 1A and 1B. However, in this embodiment, the entirety of the core portion 102 contains nano-sized voids 107 such that the entire core portion 102 is nano-structured. In this embodiment, the core portion 102 may have a step refractive index profile, as described hereinabove, or, alternatively, a graded refractive index profile, with an α-value of, for example, greater than or equal to about 1.8 and less than or equal to about 2.3.

Referring now to FIG. 5, one embodiment of an illumination system including a light diffusing optical fiber bundle 500 optically coupled to a light source 550, such that at least a portion of the emitted light enters the light diffusing optical fiber bundle 500, is schematically depicted. The light diffusing optical fiber bundle 500 includes an optically transmissive jacket 502 and a plurality of light diffusing optical fibers 100 disposed within the optically transmissive jacket 502. The plurality of light diffusing optical fibers 100 extend along a length of the optically transmissive jacket 502 such that the plurality of light diffusing optical fibers 100 are not interwoven. In some embodiments, the plurality of light diffusing optical fibers 100 may extend within the optically transmissive jacket 502 in a "loose tube" configuration. In some embodiments, the long axes of each of the plurality of light diffusing optical fibers are substantially parallel to one another at a given location along the length of the optically transmissive jacket 502. In some embodiments, each of the plurality of light diffusing optical fibers 100 is independently positioned within the optically transmissive jacket 502. As used herein, "independently positioned" describes a light diffusing optical fiber that is not adjoined or affixed to other adjacent light diffusing optical fibers. Because the light diffusing optical fibers 100 are not interwoven along a length of the optically transmissive jacket 502, the light diffusing optical fiber bundle 500 may be more flexible and may be bent more easily than if the light diffusing optical fibers 100 were interwoven within the optically transmissive jacket 502. For example, in some embodiments, the light diffusing optical fiber bundle 500, in which the plurality of light diffusing optical fibers 100 are not interwoven has a smaller minimum bend radius than the minimum bend radius of a light diffusing optical fiber bundle in which the light diffusing optical fibers are interwoven. Furthermore, light diffusing optical fibers 100 that are not interwoven within the optically transmissive jacket 502 may provide for enhanced emission characteristics along the length of the optically transmissive jacket 502.

Still referring to FIG. 5, the optically transmissive jacket 502 encompasses the plurality of light diffusing optical fibers 100. In some embodiments, the optically transmissive jacket 502 is formed from a polymer. For example, the optically transmissive jacket 502 may be formed from polyvinyl chloride, clarified polypropylene, or polycarbonate. In other embodiments, the optically transmissive jacket 502 may be formed from other optically transmissive polymers. In some embodiments, the optically transmissive jacket 502 may include a scattering agent, a phosphor, or both a scattering agent and a phosphor. In some embodiments, the optically transmissive jacket 502 may be formed from a non-absorbing material.

In the embodiment depicted in FIG. 5, the light diffusing optical fiber bundle 500 is a round bundle. However, it should be understood that in other embodiments the light diffusing optical fiber bundle 500 may not be round, such as in embodiments in which the light diffusing optical fiber bundle 500 is a ribbon stack, a ribbon, or the like. In some embodiments, the light diffusing optical fiber bundle 500 is arranged in the shape of the light source 550 in order to increase coupling efficiency between the light source 550 and the light diffusing optical fiber bundle 500. For example, if the light source 550 is square-shaped, the light diffusing optical fiber bundle 500 may be arranged such that a cross section of the light diffusing optical fiber bundle 500 is square shaped. Similarly, if the light source 550 is round, the light diffusing optical fiber bundle 500 may be a round bundle, as depicted in FIG. 5. However, it should be understood that in other embodiments the light diffusing optical fiber bundle 500 may not be the same shape as the light source 550.

The light diffusing optical fiber bundle 500 depicted in FIG. 5 includes 12 light diffusing optical fibers 100. In some embodiments, the light diffusing optical fiber bundle 500 may include 12 light diffusing optical fibers 100, each having a diameter of about 250 µm to about 300 µm. Embodiments containing 12 light diffusing optical fibers 100 may be enclosed within the optically transmissive jacket 502 utilizing standard manufacturing processes. In some embodiments, the light diffusing optical fiber bundle 500 may include more or less than 12 light diffusing optical fibers 100, such as in embodiments in which the light diffusing optical fiber bundle 500 includes 12 to 80 fibers. In other embodiments, the light diffusing optical fiber bundle 500 may include less than 12 fibers or more than 80 fibers.

In some embodiments, the plurality of light diffusing optical fibers 100 may protrude from an end of the optically transmissive jacket 502 in order to enhance the coupling efficiency between the light diffusing optical fiber bundle 500 and the light source 550. In other embodiments, at least one of the plurality of light diffusing optical fibers 100 may not include a cladding 108 and/or the coating layer 110 at an end of the light diffusing optical fiber 100 proximate the light source 550, such as in embodiments in which the end of the light diffusing optical fiber 100 nearest the light source 550 is stripped to enhance coupling efficiency of the light emitted from the light source 550 into the core of the light diffusing optical fiber 100.

Still referring to FIG. 5, in some embodiments, a first end 510a of a coupling fiber 510 may be affixed to an end of at least one of the plurality of light diffusing optical fibers 100 and a second end 510b of the coupling fiber 510 may be positioned proximate the light source 550, such that the light propagates from the light source 550, through the coupling fiber 510, and into the light diffusing optical fiber 100. In some embodiments, the coupling fiber 510 may be an optical transmission fiber or a polymer optical fiber In some embodiments, an end of each of the plurality of light diffusing optical fibers 100 may be coupled to a first end of a coupling fiber and second ends of the coupling fibers may be grouped together proximate the light source 550, thereby harvesting light from the light source 550, which is transmitted through the coupling fibers and into the plurality of light diffusing optical fibers 100.

Still referring to FIG. 5, the light source 550 may be a Lambertian light source. For example, in some embodiments, the light source 550 includes at least one LED. In other embodiments, the light source 550 may be a Lambertian light source other than an LED, such as reflective surfaces illuminated by collimated light sources (e.g., lasers, lamps, etc.). In some embodiments, the light source 550 may not be a Lambertian light source, such as in embodiments in which the light source 550 is a laser diode, or the like.

Figure 6:
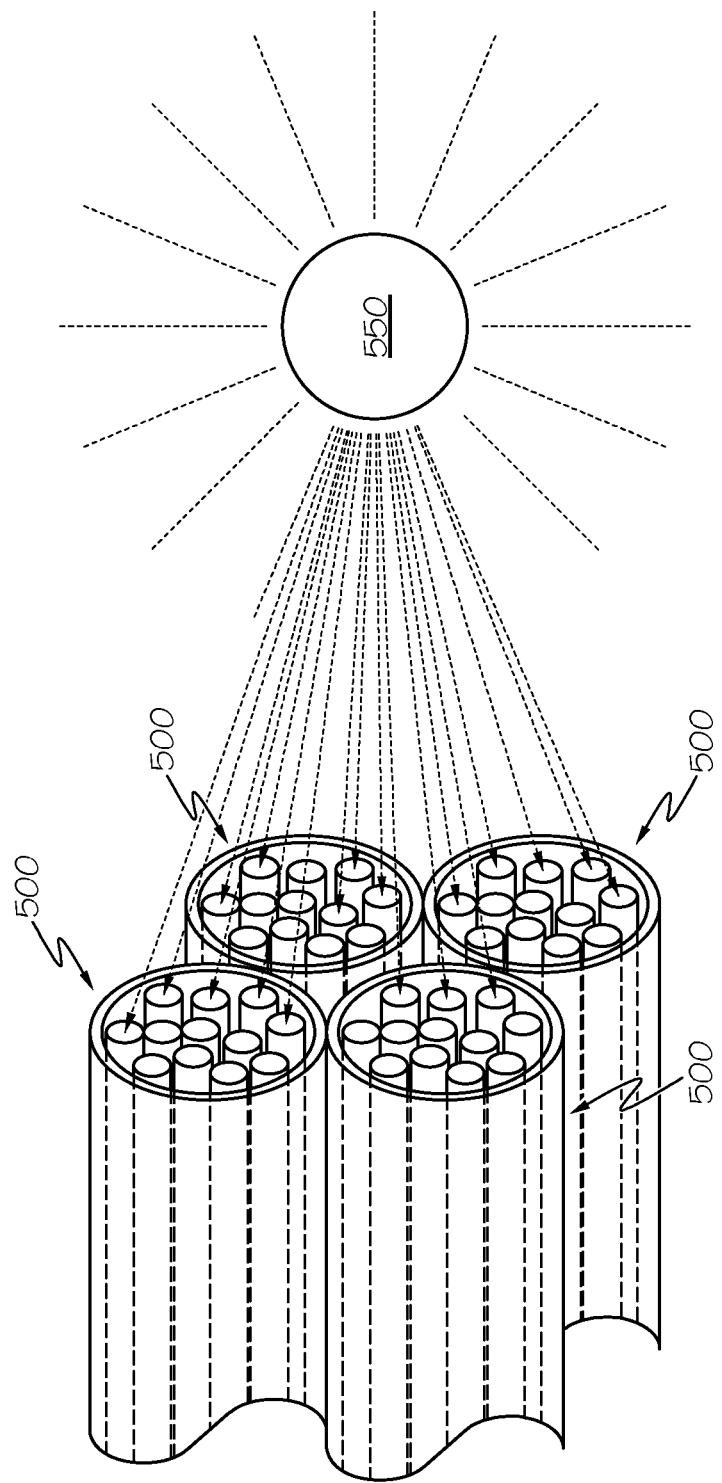
FIG. 6 schematically depicts an illumination system including a plurality of light diffusing optical fiber bundles, according to one or more embodiments shown and described herein.

Referring now to FIG. 6, one embodiment of an illumination system including a plurality of light diffusing optical fiber bundles 500 optically coupled to a light source 550 is schematically depicted. As depicted in FIG. 6, each of the plurality of light diffusing optical fiber bundles 500 is optically coupled to the light source 550 such that at least a portion of the emitted light enters the plurality of light diffusing optical fiber bundles 500.

In some embodiments, the plurality of light diffusing optical fiber bundles 500 may be arranged in the shape of the light source 550 in order to increase coupling efficiency between the light source 550 and the plurality of light diffusing optical fiber bundles 500. For example, in embodiments in which the light source 550 is circular, the plurality of light diffusing optical fiber bundles 500 may be configured in a circular arrangement. Similarly, in embodiments in which the light source 550 is square, the plurality of light diffusing optical fiber bundles 500 may be configured in a square arrangement. The plurality of light diffusing optical fiber bundles 500 may be arranged in a variety of ways, including a round configuration, a ribbon stack configuration, a ribbon configuration, and the like.

By coupling a plurality of light diffusing optical fiber bundles 500 to the light source 550, as depicted in FIG. 6, a greater percentage of the light emitted by the light source 550 may be transmitted by the plurality of light diffusing optical fibers 100 than if a single light diffusing optical fiber bundle 500 were utilized.

Figure 7:
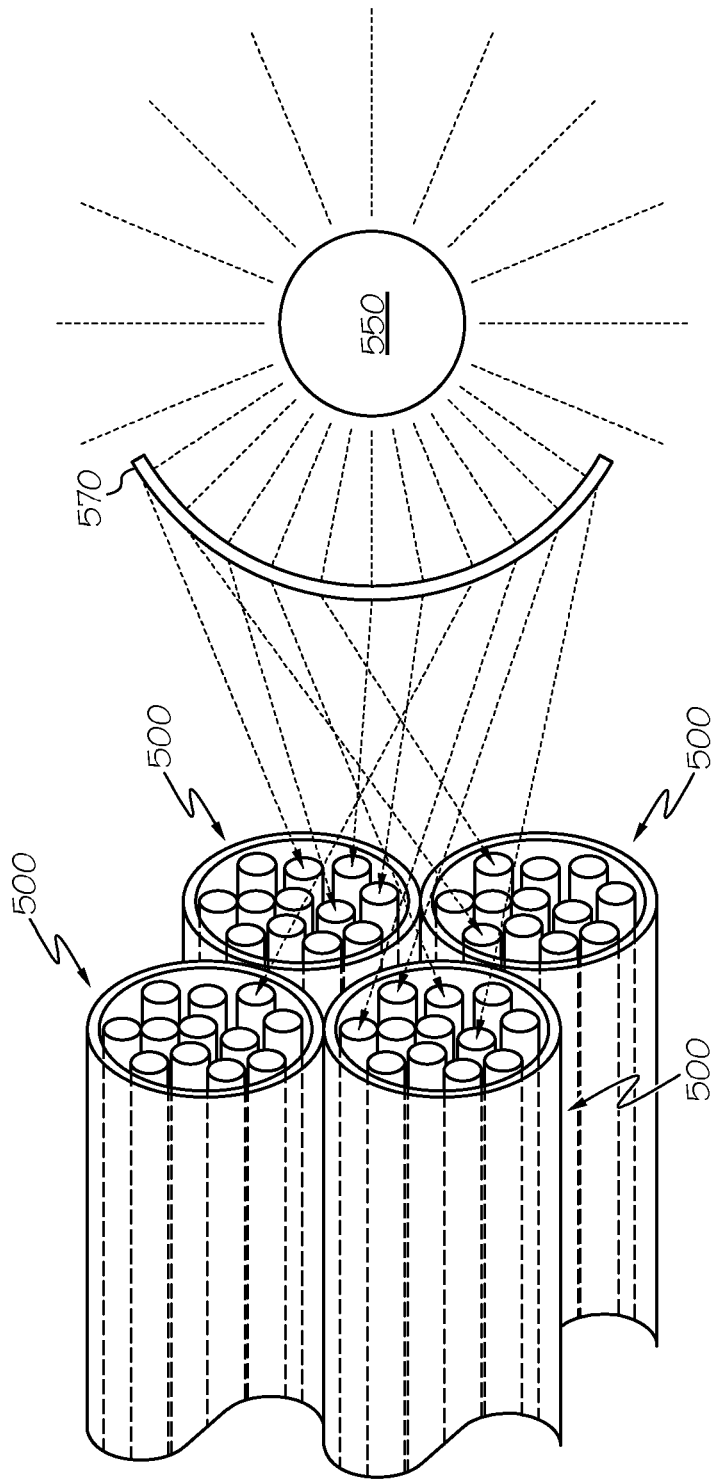
FIG. 7 schematically depicts an illumination system including coupling optics optically disposed between a plurality of light diffusing optical fiber bundles and a light source, according to one or more embodiments shown and described herein.

Referring now to FIG. 7, one embodiment of an illumination system including coupling optics 570 optically disposed between a plurality of light diffusing optical fiber bundles 500 and a light source 550 is schematically depicted. The coupling optics 570 may focus the light emitted by the light source 550 in the direction of one or more of the plurality of light diffusing optical fiber bundles 500. In some embodiments, the coupling optics 570 may include a parabolic concentrator. In some embodiments, the coupling optics 570 may include a conical concentrator. While the embodiment depicted in FIG. 7 includes coupling optics 570 focusing light in the direction of a plurality of light diffusing optical fiber bundles 500, it should be understood that in other embodiments, the coupling optics 570 may focus light from the light source 550 in the direction of a single light diffusing optical fiber bundle 500.

An illumination system with coupling optics 570 optically disposed between the light source 550 and the plurality of light diffusing optical fiber bundles 500, as depicted in FIG. 7, a greater percentage of the light emitted by the light source 550 may be harvested by the plurality of light diffusing optical fiber bundles 500 than in an illumination system that does not include coupling optics 570.

Figure 8:
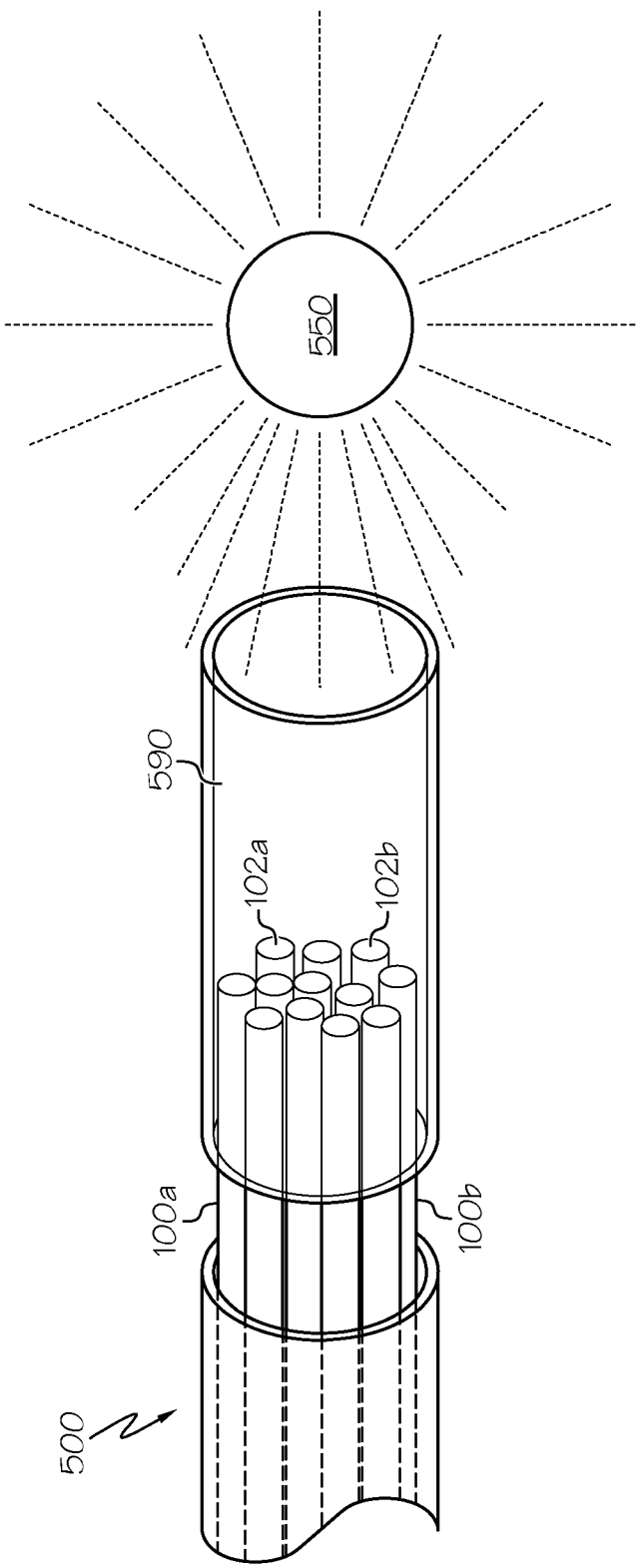
FIG. 8 schematically depicts an illumination system including a polymer optical fiber affixed to ends of a plurality of light diffusing optical fibers, according to one or more embodiments shown and described herein.

Referring now to FIG. 8, an illumination system including a light source 550 and a polymer optical fiber 590 affixed to ends of a plurality of light diffusing optical fibers 100 is schematically depicted. The plurality of light diffusing optical fibers 100 includes a first light diffusing optical fiber 100a having a first end 102a and a second light diffusing optical fiber 100b having a first end 102b. The polymer optical fiber 590 is affixed to the first end 102a of the first light diffusing optical fiber 100a and the first end 102b of the second light diffusing optical fiber 100b.

Still referring to FIG. 8, in some embodiments, the polymer optical fiber 590 may be affixed to an end of each of the plurality of light diffusing optical fibers 100 of the light diffusing optical fiber bundle 500. In other embodiments, the polymer optical fiber 590 may not be affixed to an end of at least one of the plurality of light diffusing optical fibers 100 in the light diffusing optical fiber bundle 500.

Furthermore, while the plurality of light diffusing optical fibers 100 are inserted into the polymer optical fiber 590 in the embodiment depicted in FIG. 8, in other embodiments, the polymer optical fiber 590 may abut or be separated from the plurality of light diffusing optical fibers 100.

Moreover, in some embodiments, a plurality of light diffusing optical fiber bundles 500, each containing a plurality of light diffusing optical fibers 100, may be affixed to the polymer optical fiber 590. For example, in some embodiments, the ends of the plurality of light diffusing optical fibers 100 of each of the plurality of light diffusing optical fiber bundles 500 may be bundled together in a collective bundle that is optically coupled to the light source 550. In some embodiments in which the ends of the plurality of light diffusing optical fibers 100 of each of the plurality of light diffusing optical fiber bundles 500 are bundled together in a collective bundle, the ends of the plurality of light diffusing optical fibers 100 may not include the cladding 108 and/or coating layer 110.

By coupling an end of the light diffusing optical fiber bundle 500 to the polymer optical fiber 590, as depicted in FIG. 8, the polymer optical fiber 590 may collect light emitted from the light source 550 and effectively guide the light into the plurality of light diffusing optical fibers 100 of the light diffusing optical fiber bundle 500.

In some embodiments, a diameter of the polymer optical fiber 590 substantially matches a diameter of the plurality of light diffusing optical fibers 100. In other embodiments, the diameter of the polymer optical fiber 590 may be greater than or less than the diameter of the plurality of light diffusing optical fibers 100. In some embodiments, the polymer optical fiber 590 is formed from polymethylmethacrylate ("PMMA"). However, it should be understood that in other embodiments, the polymer optical fiber 590 may be formed from a polymer other than PMMA, such as a perflourinated polymer (e.g., polyperfluorobutenylvinylether). In some embodiments, the polymer optical fiber 590 includes a fluorinated polymer cladding.

The light diffusing optical fiber bundle 500 may be affixed to the polymer optical fiber 590 of FIG. 8 in a variety of ways. For example, in one embodiment, the light diffusing optical fiber bundle 500 and the polymer optical fiber 590 are provided. An insertion end of the polymer optical fiber 590 is softened. Then, an end of the light diffusing optical fiber bundle 500 is inserted into the softened insertion end of the polymer optical fiber 590, thereby affixing the light diffusing optical fiber bundle 500 to the polymer optical fiber 590 upon the cooling of the polymer optical fiber 590. In some embodiments, the polymer optical fiber 590 is softened by heating the polymer optical fiber 590. The polymer optical fiber 590 may be heated to a temperature in the range from about 150° C. to about 280° C. For example, in some embodiments the polymer optical fiber 590 is softened by heating the polymer optical fiber 590 above a temperature of 200° C. for a few seconds. In some embodiments, an adhesion promoter is applied to at least one of the end of the light diffusing optical fiber bundle 500 and the insertion end of the polymer optical fiber 590. For example, in embodiments in which an adhesion promoter is applied to the light diffusing optical fiber bundle 500, the adhesion promoted may include a silane, such as tri-alkoxysilane, tri-aryloxy silane, or aryloxy-alkoxy silane. However, it should be understood that in other embodiments in which an adhesion promoter is applied to the light diffusing optical fiber bundle 500, the adhesion promoter may not be a silane, such as in embodiments in which the applied adhesion promoter is a titanate or a zirconate.

In some embodiments, the end of the light diffusing optical fiber bundle 500 that is inserted into the polymer optical fiber 590 may not include the optically transmissive jacket 502. Furthermore, in some embodiments, the ends of each of the plurality of light diffusing optical fibers 100 that are inserted into the polymer optical fiber 590 may not include the cladding 108 and/or coating layer 110. For example, in some embodiments, the optically transmissive jacket 502 may be removed from an end of the light diffusing optical fiber bundle 500, the cladding 108 and/or coating layer 110 may be stripped from the ends of each of the plurality of light diffusing optical fibers 100, and the stripped ends of each of the plurality of light diffusing optical fibers 100 may be compressed together and inserted into the insertion end of the polymer optical fiber 590.

In some embodiments, a plurality of light diffusing optical fiber bundles 500, each containing a plurality of light diffusing optical fibers 100, may be affixed to the polymer optical fiber 590. For example, the ends of the plurality of light diffusing optical fibers 100 of each of the plurality of light diffusing optical fiber bundles 500 may be bundled together in a collective bundle. In some embodiments in which the ends of the plurality of light diffusing optical fibers 100 of each of the plurality of light diffusing optical fiber bundles 500 are bundled together in a collective bundle, the ends of the plurality of light diffusing optical fibers 100 may not include the cladding 108 and/or coating layer 110, such as when the cladding 108 and/or coating layer 110 is stripped from the ends of each of the plurality of light diffusing optical fibers 100 prior to insertion into the polymer optical fiber 590.

In some embodiments, a polymeric end may be formed on an end of the light diffusing optical fiber bundle 500 in order to enhance the coupling efficiency of the plurality of light diffusing optical fibers 100 and the light source 550. For example, the end of the light diffusing optical fiber bundle 500 may be inserted within a mold larger than the light diffusing optical fiber bundle 500, liquid polymerizing material may be introduced into the mold, and the liquid polymerizing material may be solidified to form the polymeric end on the end of the light diffusing optical fiber bundle 500. In some embodiments, the polymeric end may be solidified by ultraviolet curing, thermal curing, or the like. In other embodiments, a polymeric end may be formed on an end of the light diffusing optical fiber bundle 500 by injection molding a thermoplastic polymer into a mold surrounding the end of the light diffusing optical fiber bundle 500. In some embodiments, the optically transmissive jacket 502 may be removed from an end of the light diffusing optical fiber bundle 500, the cladding 108 and/or coating layer 110 may be stripped from the ends of each of the plurality of light diffusing optical fibers 100, and the stripped ends of each of the plurality of light diffusing optical fibers 100 may be compressed together before the polymeric end is formed on the end of the light diffusing optical fiber bundle 500.

It should now be understood that light diffusing optical fiber bundles that include a plurality of non-interwoven light diffusing optical fibers disposed within a optically transmissive jacket, as described herein, may enhance the ability to bend the light diffusing optical fiber bundles, may enhance the flexibility of the light diffusing optical fiber bundles, and/or may enhance the emission characteristics of the light diffusing optical fiber bundles. Furthermore, light diffusing optical fiber bundles coupled to a Lambertian light sources, as described herein, may efficiently harvest light emitted from the Lambertian light sources. A plurality of light diffusing optical fibers within a single light diffusing optical fiber bundle or a plurality of light diffusing optical fiber bundles that are arranged in the shape of a light source optically coupled to the fibers or bundles, as described herein, may increase the coupling efficiency between the light source and the fibers or bundles. Furthermore, an illumination system in which coupling optics are optically disposed between a light source and a light diffusing optical fiber bundle, as described herein, may efficiently harvest emitted light. Finally, light diffusing optical fiber bundles in which a plurality of light diffusing optical fibers are affixed to a polymer optical fiber that is optically coupled to a light source, as described herein, may effectively guide emitted light through the polymer optical fiber into the plurality of light diffusing optical fibers, thereby enhancing the light harvested by the light diffusing optical fiber bundles.

Thus, according to at least some embodiments a light diffusing optical fiber bundle includes: (i) an optically transmissive jacket; and (ii) a plurality of light diffusing optical fibers disposed within the optically transmissive jacket, wherein each of the plurality of light diffusing optical fibers includes a glass core and a plurality of nano-sized voids, and the plurality of light diffusing optical fibers extend along a length of the optically transmissive jacket. The optically transmissive jacket may be formed from a polymer, and may include a scattering agent, preferably either embedded in the polymer, or situated on the outer surface of the optically transmissive jacket. According to some embodiments, an illumination system may include a light source for emitting light coupled to the light diffusing optical fiber bundle described herein, such that at least a portion of the emitted light enters the light diffusing optical fiber bundle. A coupling optics may be disposed between the light source and the light diffusing optical fiber bundle. A polymer optical fiber may also be affixed to an end of the light diffusing optical fiber bundle. The illumination system may also include a plurality of the light diffusing optical fiber bundles that are optically coupled to the light source. For example, the light source may include a light emitting diode or a laser. For example, the light source has a shape (e.g., shape circular or square), and the plurality of light diffusing optical fiber bundles are arranged as a collection of light diffusing optical fiber bundles to match the shape of the light source.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A light diffusing optical fiber bundle comprising:
   an optically transmissive jacket; and
   a plurality of light diffusing optical fibers disposed within the optically transmissive jacket, wherein each of the plurality of light diffusing optical fibers includes a glass core including a plurality of nano-sized voids, and the plurality of light diffusing optical fibers extend along a length of the optically transmissive jacket such that the plurality of diffusing optical fibers are not interwoven.

2. The light diffusing optical fiber bundle of claim 1, wherein the plurality of light diffusing optical fibers includes a first light diffusing optical fiber having a first end and a second light diffusing optical fiber having a first end, the light diffusing optical fiber bundle further comprising a polymer optical fiber affixed to the first end of the first light diffusing optical fiber and the first end of the second light diffusing optical fiber, thereby coupling the plurality of light diffusing optical fibers with the polymer optical fiber.

3. The light diffusing optical fiber bundle of claim 1, further comprising a coupling fiber affixed to an end of at least one of the plurality of light diffusing optical fibers.

4. The light diffusing optical fiber bundle of claim 1, wherein the optically transmissive jacket is formed from a polymer.

5. The light diffusing optical fiber bundle of claim 4, wherein the polymer is polyvinyl chloride, clarified polypropylene, or polycarbonate.

6. The light diffusing optical fiber bundle of claim 1, wherein the optically transmissive jacket includes a scattering agent, a phosphor, or both a scattering agent and a phosphor.

7. The light diffusing optical fiber bundle of claim 1, wherein at least one of the plurality of light diffusing optical fibers has a radius less than about 150 μm.

8. The light diffusing optical fiber bundle of claim 1, wherein the glass core has a radius of about 90 μm.

9. The light diffusing optical fiber bundle of claim 1, wherein the plurality of light diffusing optical fibers includes 12 to 80 light diffusing optical fibers.

10. An illumination system comprising:
    a light source for emitting light; and
    a light diffusing optical fiber bundle optically coupled to the light source such that at least a portion of the emitted light enters the light diffusing optical fiber bundle, wherein the light diffusing optical fiber bundle includes:
    an optically transmissive jacket; and
    a plurality of light diffusing optical fibers disposed within the optically transmissive jacket, wherein each of the plurality of light diffusing optical fibers includes a glass core including a plurality of nano-sized voids, and the plurality of light diffusing optical fibers extend along a length of the optically transmissive jacket such that the plurality of diffusing optical fibers are not interwoven.

11. The illumination system of claim 10, further comprising coupling optics disposed between the light source and the light diffusing optical fiber bundle.

12. The illumination system of claim 11, wherein the coupling optics include a parabolic concentrator or a conical concentrator.

13. The illumination system of claim 10, wherein the light source includes a Lambertian light source.

14. The illumination system of claim 10, wherein the illumination system includes a plurality of the light diffusing optical fiber bundles that are optically coupled to the light source.

15. The illumination system of claim 14, wherein the light source includes a light emitting diode, the light source has a shape, and the plurality of light diffusing optical fiber bundles are arranged as a collection of light diffusing optical fiber bundles to match the shape of the light source.

16. The illumination system of claim 15, wherein the shape is circular or square.

17. The illumination system of claim 10, further comprising a polymer optical fiber affixed to an end of the light diffusing optical fiber bundle.

18. A method of affixing a light diffusing optical fiber bundle to a polymer optical fiber comprising:
providing the light diffusing optical fiber bundle comprising:
an optically transmissive jacket; and
a plurality of light diffusing optical fibers disposed within the optically transmissive jacket, wherein each of the plurality of light diffusing optical fibers includes a glass core including a plurality of nano-sized voids, and the plurality of light diffusing optical fibers extend along a length of the optically transmissive jacket such that the plurality of diffusing optical fibers are not interwoven;
providing the polymer optical fiber;
softening an insertion end of the polymer optical fiber; and
inserting an end of the light diffusing optical fiber bundle into the softened insertion end of the polymer optical fiber, thereby affixing the light diffusing optical fiber bundle to the polymer optical fiber.

19. The method of claim 18, wherein the polymer optical fiber is softened by heating the polymer optical fiber.

20. The method of claim 18, further comprising applying an adhesion promoter to at least one of the end of the light diffusing optical fiber bundle and the insertion end of the polymer optical fiber.

21. A light diffusing optical fiber bundle comprising:
an optically transmissive jacket; and
a plurality of light diffusing optical fibers disposed within the optically transmissive jacket, wherein each of the plurality of light diffusing optical fibers includes a glass core and a plurality of nano-sized voids, and the plurality of light diffusing optical fibers extend along a length of the optically transmissive jacket.

22. The light diffusing optical fiber bundle of claim 21, wherein the optically transmissive jacket is formed from a polymer, said optically transmissive jacket includes a scattering agent.

23. An illumination system comprising:
a light source for emitting light; and
a light diffusing optical fiber bundle according to claim 21, optically coupled to the light source such that at least a portion of the emitted light enters the light diffusing optical fiber bundle.

24. The illumination system of claim 23, further comprising coupling optics disposed between the light source and the light diffusing optical fiber bundle.

* * * * *